(12) United States Patent
Dang

(10) Patent No.: US 9,984,486 B2
(45) Date of Patent: May 29, 2018

(54) METHOD AND APPARATUS FOR VOICE INFORMATION AUGMENTATION AND DISPLAYING, PICTURE CATEGORIZATION AND RETRIEVING

(71) Applicant: Alibaba Group Holding Limited, George Town, Grand Cayman (KY)

(72) Inventor: Maochang Dang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days. days.

(21) Appl. No.: 15/064,362

(22) Filed: Mar. 8, 2016

(65) Prior Publication Data
US 2016/0267921 A1 Sep. 15, 2016

(30) Foreign Application Priority Data
Mar. 10, 2015 (CN) .......................... 2015 1 0104464

(51) Int. Cl.
*G06T 11/60* (2006.01)
*G06F 17/30* (2006.01)
*G10L 15/26* (2006.01)

(52) U.S. Cl.
CPC ........ *G06T 11/60* (2013.01); *G06F 17/30026* (2013.01); *G06F 17/30268* (2013.01); *G10L 15/26* (2013.01)

(58) Field of Classification Search
CPC .......................... G06F 17/241; G06K 9/00671
See application file for complete search history.

(56) References Cited

U.S. PATENT DOCUMENTS

| | | | |
|---|---|---|---|
| 5,040,211 A | 8/1991 | Schreiber | |
| 5,488,674 A | 1/1996 | Burt et al. | |
| 6,070,167 A * | 5/2000 | Qian | G06F 17/30855 |
| 6,101,289 A | 8/2000 | Kellner | |
| 6,166,803 A | 12/2000 | Miltron et al. | |
| 6,380,975 B1 * | 4/2002 | Suzuki | H04N 1/00129 |
| | | | 348/231.99 |
| 6,501,163 B1 | 12/2002 | Utsumi | |
| 6,511,442 B1 | 1/2003 | Lathan et al. | |
| 6,728,317 B1 | 4/2004 | Demos | |
| 6,774,469 B2 | 8/2004 | Utsumi | |
| 7,071,897 B2 | 7/2006 | Bronson | |
| 7,120,586 B2 * | 10/2006 | Loui | G06F 17/30265 |
| | | | 396/300 |

(Continued)

FOREIGN PATENT DOCUMENTS

| | | |
|---|---|---|
| CN | 018040 | 5/2009 |
| WO | 03058493 | 7/2003 |

OTHER PUBLICATIONS

Srihari, Rohini K., and Zhongfei Zhang. "Show&tell: A semi-automated image annotation system." IEEE multimedia 7.3 (2000): 61-71.*

*Primary Examiner* — Brian L Albertalli

(57) ABSTRACT

A method of voice information augmentation including displaying a picture and identifying an object to be augmented in the picture. The method also includes receiving the voice information and establishing a mapping relationship between the voice information and the object to be augmented. The method accurately represents the content of the picture by augmenting the different objects in the picture with the different voice information.

18 Claims, 12 Drawing Sheets

(56) References Cited

U.S. PATENT DOCUMENTS

| | | |
|---|---|---|
| 7,180,502 B2 | 2/2007 | Marvit et al. |
| 8,055,675 B2 | 11/2011 | Higgins et al. |
| 8,767,015 B2 | 7/2014 | Campbell et al. |
| 8,856,167 B2 | 10/2014 | Higgins et al. |
| 8,905,314 B2 | 12/2014 | Van Der Merwe et al. |
| 8,941,687 B2 | 1/2015 | Raghoebardajal et al. |
| 9,007,365 B2 | 4/2015 | Sandrew et al. |
| 9,183,807 B2 | 11/2015 | Small et al. |
| 9,214,044 B2 | 12/2015 | Clemo et al. |
| 9,224,058 B2 | 12/2015 | Paul et al. |
| 9,275,079 B2 | 3/2016 | Nalawadi et al. |
| 9,317,531 B2 * | 4/2016 | Baker ............... G06F 17/30265 |
| 2003/0016236 A1 | 1/2003 | Bronson |
| 2003/0052398 A1 | 3/2003 | Utsumi et al. |
| 2004/0141630 A1 | 6/2004 | Bhaskaran et al. |
| 2005/0212758 A1 | 9/2005 | Marvit et al. |
| 2006/0204214 A1 | 9/2006 | Shah et al. |
| 2007/0124507 A1 * | 5/2007 | Gurram ................ G06F 3/0481 710/1 |
| 2008/0152197 A1 * | 6/2008 | Kawada ............... H04N 1/2112 382/115 |
| 2008/0186255 A1 | 8/2008 | Cohen et al. |
| 2010/0185617 A1 | 7/2010 | Burazerovic et al. |
| 2010/0309226 A1 | 12/2010 | Quack et al. |
| 2010/0323615 A1 | 12/2010 | Vock et al. |
| 2011/0107270 A1 | 5/2011 | Wang et al. |
| 2011/0310120 A1 | 12/2011 | Narayanan |
| 2011/0320429 A1 | 12/2011 | Doig et al. |
| 2012/0078938 A1 | 3/2012 | Davis et al. |
| 2012/0081394 A1 | 4/2012 | Campbell et al. |
| 2012/0131470 A1 | 5/2012 | Wessling et al. |
| 2012/0170847 A1 | 7/2012 | Tsukidate |
| 2012/0229508 A1 | 9/2012 | Wigdor et al. |
| 2012/0262486 A1 | 10/2012 | Raghoebardajal et al. |
| 2012/0263345 A1 * | 10/2012 | Watanabe ............. G06F 17/241 382/100 |
| 2013/0002840 A1 * | 1/2013 | Toney ................. G06F 21/6254 348/61 |
| 2013/0007043 A1 * | 1/2013 | Phillips ............ G06F 17/30038 707/769 |
| 2013/0084012 A1 | 4/2013 | Murphy et al. |
| 2013/0145241 A1 | 6/2013 | Salama et al. |
| 2013/0147687 A1 | 6/2013 | Small et al. |
| 2013/0159856 A1 | 6/2013 | Ferren et al. |
| 2013/0218024 A1 | 8/2013 | Boctor et al. |
| 2013/0249783 A1 * | 9/2013 | Sonntag ............. G06F 17/241 345/156 |
| 2013/0321463 A1 | 12/2013 | Clemo et al. |
| 2014/0085333 A1 | 3/2014 | Pugazhendhi et al. |
| 2014/0164901 A1 | 6/2014 | McDowell et al. |
| 2014/0164927 A1 * | 6/2014 | Salaverry ............ H04N 1/2112 715/727 |
| 2014/0168258 A1 | 6/2014 | Dearman et al. |
| 2014/0191976 A1 | 7/2014 | Peevers et al. |
| 2014/0192140 A1 | 7/2014 | Peevers et al. |
| 2014/0195222 A1 | 7/2014 | Peevers et al. |
| 2014/0289323 A1 * | 9/2014 | Kutaragi ............... G06Q 50/01 709/203 |
| 2016/0048880 A1 | 2/2016 | Linden et al. |

* cited by examiner

METHOD AND APPARATUS FOR VOICE INFORMATION AUGMENTATION AND DISPLAYING, PICTURE CATEGORIZATION AND RETRIEVING

CROSS REFERENCE TO RELATED APPLICATION

This application claims the benefits to Chinese Patent Application No. 201510104464.1, filed on Mar. 10, 2015, which is incorporated herein by reference in its entirety.

TECHNICAL FIELD

Embodiments of the present invention relate generally to picture processing, and more particularly to a method and apparatus for voice information augmenting and displaying pictures.

BACKGROUND

Currently, the utilization of pictures or videos to record life moments is a highly popular approach adopted by people. Photo-taking is an add-on functionality to cell phones because cell phones are compact, thin, and easy to carry and easy to operate. Taking photos and videos with cell phones are popular among people. The main purpose of photo-taking is to record memories. With time, memories cued by the photos tend to fade away absent the environmental or contextual memory. At the same time, video-recording, storage, browsing, sharing etc., has not yet reached the level of ease and convenience preferred by people. On the one hand, there have been increasingly high demands for functionality related to cell phone photo-taking and diversity in artistic expression in photos. On the other hand, there have also been demands from people for easier and more convenient recording, storing, browsing, sharing, etc. Consequently, it has become an important problem regarding how to accurately represent the content of the pictures.

Therefore, there exists a need for new techniques to solve the above described problems.

SUMMARY

In order to solve the problem of how to accurately represent the content of a picture, the embodiments of the present disclosure provide for a method and apparatus for voice information augmentation, a method and apparatus for displaying voice information, a method and apparatus for categorizing pictures, as well as a method and apparatus for retrieving pictures.

According to an exemplary embodiment of the present disclosure, a method of voice information augmentation includes displaying a picture and identifying an object to be augmented in the picture. The method also includes receiving voice information and establishing a mapping relationship between the voice information and the objects to be augmented.

According to another exemplary embodiment of the present disclosure, an apparatus for voice information augmentation includes a first display module, a first processing module and a first voice information input module. The first display module is configured to display a picture. The first processing module is configured to identify an object to be augmented in the picture. The first voice information input module is configured to receive voice information, where the first processing module establishes a mapping relationship between the voice information and the objects to be augmented.

According to yet another exemplary embodiment of the present disclosure, a method for voice information displaying includes displaying a picture, the picture including objects and voice information mapped to the objects. The method also includes receiving a second selection command to designate an object selected by the second selection command as an object to be displayed. The method further includes inquiring about voice information mapped to the object to the displayed and displaying the voice information.

According to still another exemplary embodiment of the present disclosure, an apparatus for voice information displaying includes a second display module, a second processing module, a second processing module and a voice information output module. The second display module is configured to display a picture, the picture including objects and voice information mapped to the objects. The second selection module is configured to receive a second selection command. The second processing module is configured to designate an object selected by the second selection command as an object to be displayed and to inquire about voice information mapped to the object to be displayed. The voice information output module is configured to display the voice information.

According to still yet another exemplary embodiment of the present disclosure, a method of categorizing pictures includes reading pictures, the pictures including objects and voice information mapped to the objects. The method also includes categorizing the pictures by analyzing content of the voice information mapped to the objects.

According to further yet another exemplary embodiment of the present disclosure, an apparatus for categorizing pictures includes a reading module and a third processing module. The reading module is configured to read pictures, the pictures including objects and voice information mapped to the objects. The third processing module is configured to categorize the pictures based on content of the voice information mapped to the objects.

According to a still further another exemplary embodiment of the present disclosure, a method of retrieving pictures includes receiving inquiring voice information and inquiring pictures stores, wherein the pictures comprise objects and voice information mapped to the objects. The method also includes comparing content of the inquiring voice information with content of the voice information mapped to the objects. The method further includes, in response to the content of the voice information mapped to the objects including the content of the inquiring voice information, displaying picture corresponding to the voice information mapped to the objects.

According to a yet still further another exemplary embodiment of the present disclosure, an apparatus for retrieving pictures includes a second voice information input module, an inquiring module, a comparing module and a third displaying module. The second voice information input module is configured to receive inquiring voice information. The inquiring module is configured to inquire pictures stores, where the pictures comprise objects and voice information mapped to the objects. The comparing module is configured to compare content of the inquiring voice information with content of the voice information mapped to the objects. The third displaying module is configured to, in response to the content of the voice information mapped to the objects includes the content of the inquiring voice information, display picture corresponding to the voice information mapped to the objects.

DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

In the following description, numerous specific details are set forth in order to provide a thorough understanding of the present disclosure. However, it will become obvious to those skilled in the art that the present disclosure may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments mutually exclusive of other embodiments. Used herein, the terms "upper", "lower", "top", "bottom", "middle", "upwards", and "downwards" are intended to provide relative positions for the purposes of description, and are not intended to designate an absolute frame of reference. Further, the order of blocks in process flowcharts or diagrams representing one or more embodiments of the disclosure do not inherently indicate any particular order nor imply any limitations in the disclosure.

Embodiments of the present disclosure are discussed herein with reference to FIGS. 1-9E. However, those skilled in the art will readily appreciate that the detailed description given herein with respect to these figures is for explanatory purposes as the disclosure extends beyond these limited embodiments.

Figure 1:
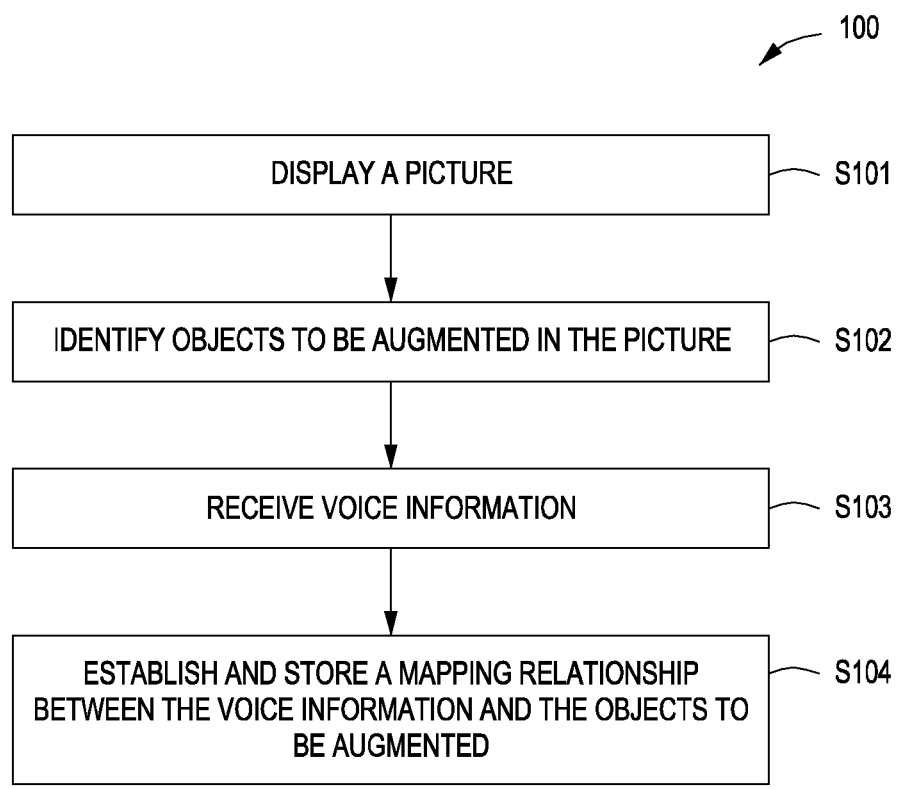
FIG. 1 is a flow chart of an exemplary method of voice information augmentation in accordance with an embodiment of the present disclosure.

Referring to FIG. 1, a flow chart of an exemplary method of voice augmentation is shown in accordance with embodiments of the present disclosure. Method 100 starts in step S101, where a picture is displayed. In this exemplary embodiment, the executing entity is the voice information augmentation apparatus. The voice information augmentation apparatus includes a first displaying module for displaying the picture, which includes one or more objects.

In step S102, an object to be augmented is identified. The above described voice information augmentation apparatus further includes a first processing module, which identifies objects to be augmented in the picture.

In step S103, voice information is received. The voice information augmentation apparatus further includes a voice information input module, which receives the voice information and transmits the received voice information to the first processing module.

In step S104, a mapping relationship between the voice information and the object to be augmented is established. After the first processing module receives the voice information, a mapping relationship is established between the voice information and the object to be augmented. For different objects in the picture, different voice information is augmented with regard to the picture to accurately represent the content of the picture.

Further, the method also includes, prior to the establishment of a mapping relationship between the voice information and the objects to be augmented, a command of voice information augmentation is received. Correspondingly, the voice information augmentation apparatus further includes a first receiving module, which receives the command of voice information augmentation and transmits the command to the first processing module. The first processing module triggers the process of voice information augmentation according to the command of voice information augmentation. Through the use of the command to trigger the process of voice information augmentation, processes that mistakenly enter voice information augmentation can be avoided.

In an alternative embodiment, when the first receiving module receives the command of the voice information, if the received command is the same as the command of voice information augmentation pre-defined in the first processing module, the process of voice information augmentation is triggered. However, due to, the potential lack of accuracy in recognizing voice information, the accuracy of triggering the process of voice information augmentation by voice information recognition may not be good enough.

Method 100 also includes, when displaying the picture, creating a control of voice information augmentation. The voice information augmentation command is the command generated when the control of voice information augmentation is being clicked on.

When the first display module displays the picture, the first processing module creates a voice information augmentation on-screen control, which is also displayed by the first display module. When the control of voice information augmentation is clicked on, e.g., there is a need to execute voice information augmentation, the first receiving module receives the command generated by the on-screen control being clicked upon, and transmits the command to the first processing module. The first processing module triggers the process of the voice information augmentation according to the command received. Through the first display module displaying the on-screen control, the triggering of the process of voice information augmentation can be performed with more ease and accuracy.

Furthermore, the objects that are identified to be augmented are further noted below. By use of image structure segmentation or image non-structure segmentation, different objects in the picture can be automatically recognized. Also, different objects can be displayed with special effects. Upon receiving the first selection command, the target object selected by the selection command is designated as the object to be augmented.

The first processing module utilizes methods of image structure segmentation or image non-structure segmentation to automatically recognize different objects in a picture. The details of both the image structure segmentation and image non-structure segmentation are well known as illustrated in the doctoral thesis of Mr. Yanyun Zhao, entitled "Extraction and recognition of characteristics of objects in pictures." The first displaying module displays the recognized objects with special effects such as blurring, framing the outline of the object with red borders, displaying the object in a three dimensional manner, and popping up cursor controls for the area corresponding to the object, etc. Any forms of display highlighting can be used.

The voice information augmentation apparatus further includes a first selection module, which receives a first selection command and transmits the received selection command to the first processing module, when the user clicks on an object in the displayed photo. The first processing module designates the object selected as the object to be augmented. Further, the first voice information input module receives the voice information and transmits the received voice information to the first processing module, which establishes a mapping relationship between the voice information and the selected object.

Furthermore, details are provided for the identified objects to be augmented in the picture. Hand motioned delineation commands are received and regions are defined according to the hand motion commands. Based upon the defined regions and in combination with the image structure segmentation and image non-structure segmentation, determined objects are identified and designated as the object to be augmented.

When the user motions by hand to delineate a certain image in the picture, the first selection module receives such hand motioned delineation commands, and transmits the hand motioned delineation commands to the first processing module. The first processing module determines a defined region according to the received hand motioned commands, and based on the delineated region and in combination with the image structure segmentation and image non-structure segmentation, determines the object defined. The first processing module also designates the defined object as the object to be augmented. Furthermore, the first voice information input module receives the voice information and transmits the received voice information to the first processing module, which establishes a mapping relationship between the voice information and the defined object.

Still further, method 100 can include the steps of receiving an access permission configuring command, and configuring access permissions for the voice information mapped to the object to be augmented according to the access permission configuring command. In order to ensure security, the voice information augmentation apparatus further includes an access permission configuration module, which receives the access permission configuring command, and configures the access permissions for the voice information mapped to the object to be augmented according to the access permission configuring command.

In an alternative embodiment, the access permission is configured as public or private. If the device performs the voice information augmentation, the voice information is permitted to be accessed or edited by the device. Otherwise, if the device does not perform the voice information augmentation, and if the access permission associated with the voice information is public, then the voice information is permitted to be accessed by the device, but is not permitted to be edited by the device. Further, if the device does not perform voice information augmentation, and if the access permission associated with the voice information is private, then the voice information is not permitted to be accessed or edited by the device. In other alternative embodiments, the user can configure or modify different settings for such access permissions.

It should be appreciated by one having ordinary skill in the art that, corresponding to the method of voice information augmentation, the present disclosure also provides for an apparatus for voice information augmentation.

Figure 2:
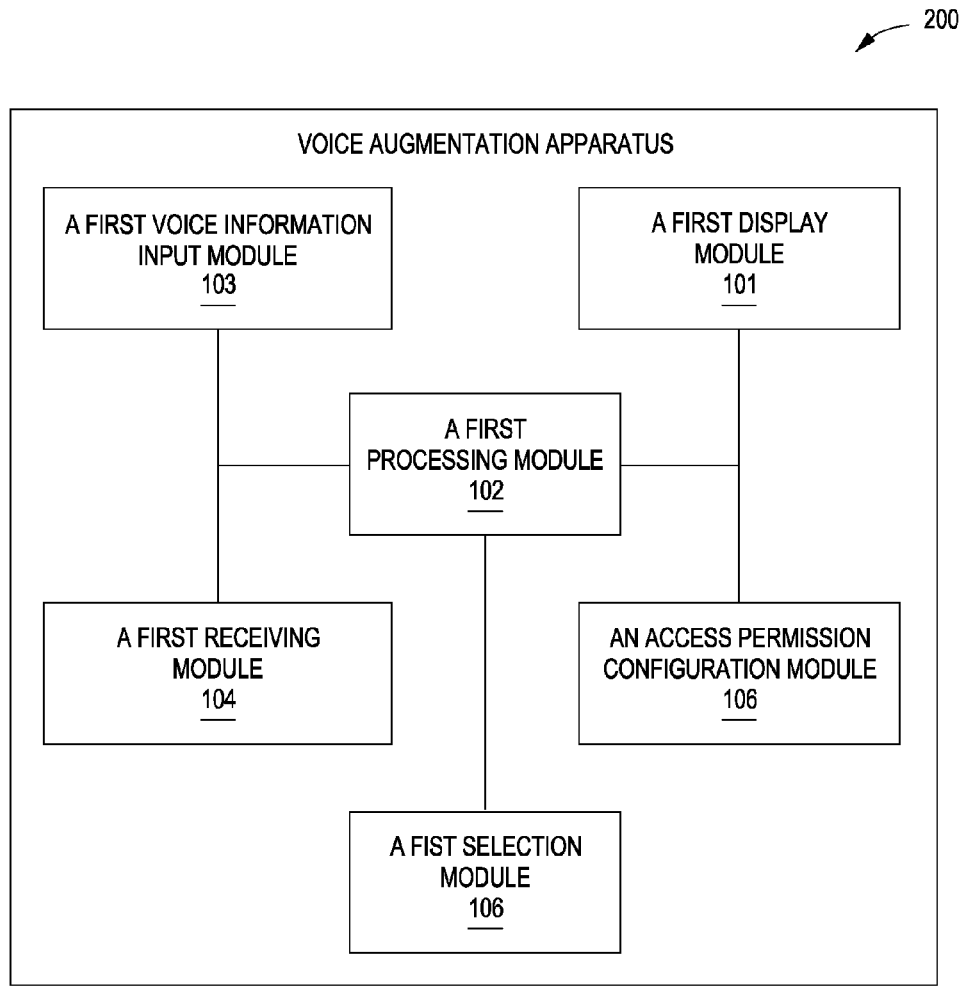
FIG. 2 is block diagram of an exemplary apparatus for voice information augmentation in accordance with an embodiment of the present disclosure.

Referring to FIG. 2, a block diagram of an exemplary apparatus for voice information augmentation is shown in accordance with embodiments of the present disclosure. Apparatus 200 includes a first display module 101, a first processing module 102, and a first voice information input module 103. The first display module 101 is configured to display pictures. The first processing module 102 is configured to identify objects in the picture to be augmented. The first voice information input module 103 is configured to receive voice information. The first processing module 102 can be further configured to establish mapping relationships between the voice information and the objects to be augmented.

Further, the apparatus 200 also includes a first receiving module 104, which is configured to, prior to establishing mapping relationships between the voice information and the objects to be augmented, receive a voice information augmentation command. Furthermore, the first processing module 102 can be configured to create a voice information augmentation control. Correspondingly, the display module 101 can be further configured to display the on-screen voice information augmentation control. The first receiving module 104 can be configured to receive the command generated by the on-screen control being clicked on.

Further, the first processing module 102 can be configured to, by use of the methods of image structure segmentation and the image non-structure segmentation, automatically recognize different objects in the picture. The first displaying module 101 can be configured to display different objects with special effects. The apparatus 200 further includes a first selection module 105 configured to receive a first selection command. The first processing module 102 is configured to designate the selected object as the object to be augmented.

Still further, the apparatus 200 also includes a first selection module 105 configured to receive hand motioned delineation commands, and transmit the received hand motioned delineation commands to the first processing module 102. The first processing module 102 can be configured to determine a delineated region according to a hand motioned command. The first processing module 102 can be further configured to determine a defined object based on the delineated region and in combination with the image structure segmentation and image non-structure segmentation techniques; the defined object being designated as the object to be augmented.

Yet further, apparatus 200 also includes an access permission configuration module 106, which is configured to receive an access permission configuring command, and to configure the access permissions for the voice information mapped to the object to be augmented based on the access permission configuring command.

Further, the access permission can be configured as public or private. If the device performs the voice information augmentation, the voice information is permitted to be accessed or edited by the device. Otherwise, if the device does not perform the voice information augmentation, and if the access permission associated with the voice information is public, then the voice information is permitted to be accessed by the device, but is not permitted to be edited by the device. Further, if the device does not perform the voice information augmentation, and if the access permission associated with the voice information is private, then the voice information is not permitted to be accessed or edited by the device. In other alternative embodiments, the user can configure or modify different settings for such access permission.

It should be appreciated by one having ordinary skill in the art that, corresponding to the method and apparatus for voice information augmentation, embodiments of the present disclosure also provide for a method of displaying voice information.

Figure 3:
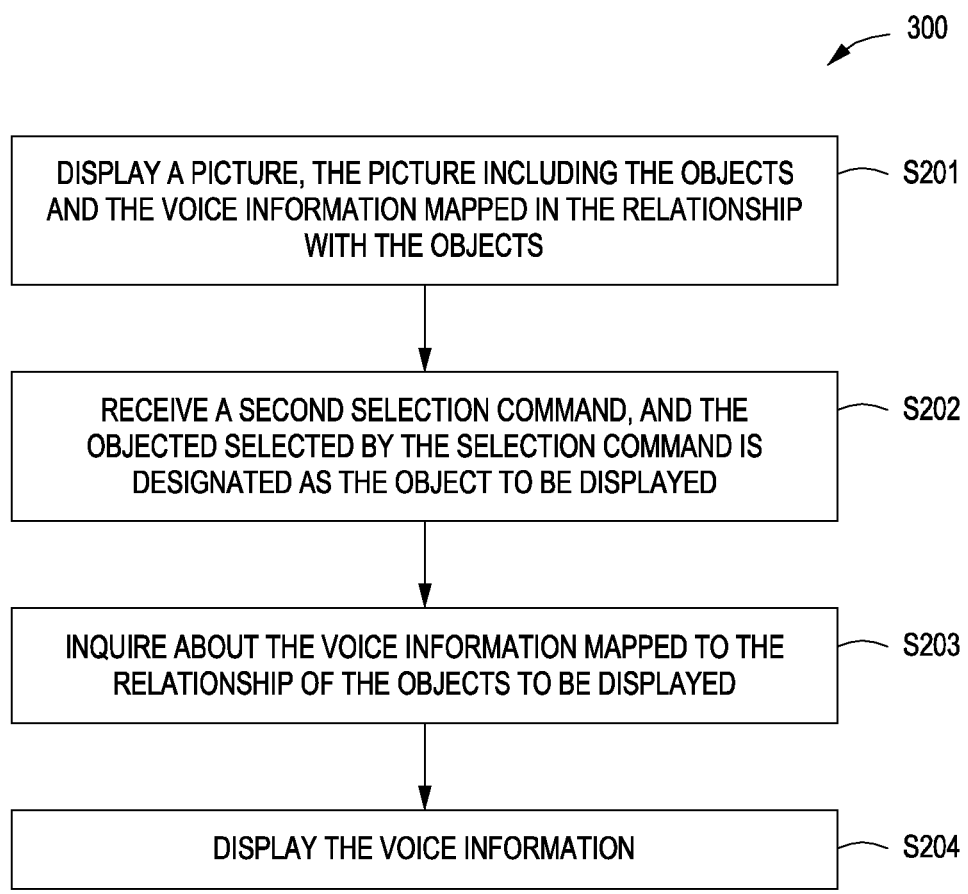
FIG. 3 is a flow chart of an exemplary method of voice information displaying in accordance with an embodiment of the present disclosure.

Referring to FIG. 3, a flow chart of an exemplary method of displaying voice information is shown in accordance with embodiments of the present disclosure. The method 300 starts in step S201, where a picture is displayed, the picture includes the object and the voice information which is mapped in the relationship with the object.

Here, the executing entity is a voice information displaying apparatus, which includes a second display module configured to display pictures. The pictures include the object and the voice information (mapped in the relationship with the objects). In step S202, a second selection command is received, and the object selected by the selection command is designated as the object to be displayed. The voice information displaying apparatus further includes a second selection module and a second processing module. The second selection module is configured to receive a second selection command, and transmit the second selection command to the second processing module.

In step S203, the voice information that is mapped to the relationship of the object to be displayed is inquired about. The second processing module is configured to search for such voice information corresponding to the mapped relationship of the object to be displayed. In step S204, the voice information is displayed. The voice information displaying apparatus further includes a voice information output module configured to display the voice information.

Alternatively, the method 300 also includes, prior to displaying the voice information, receiving a voice information displaying command. The voice information displaying apparatus can further include a second receiving module, which is configured to receive voice information displaying commands, and transmit the received commands to the second processing module. The second processing module triggers a process of displaying the voice information based on the voice information displaying commands. By use of a voice information displaying command, accidental or wrong operations of the process of displaying voice information can be avoided.

In some other alternative embodiments, the second receiving module receives voice information commands. When the received commands are the same as the voice information displaying commands that are pre-defined in the second processing module, the second processing module triggers the process of displaying the voice information. However, due to the potential lack of accuracy in recognizing voice information, the accuracy of triggering the process of voice information displaying by voice information recognition may not be good enough.

Furthermore, the method 300 also includes, when the picture is displayed, creating a voice information displaying control. The voice information displaying command is generated upon the on-screen voice information displaying control being clicked on. When the second displaying module displays a picture, the second processing module renders the voice information displaying control, which is also displayed by the second displaying module. Upon the voice information displaying control being clicked, e.g., there is a need to display the voice information, the second receiving module receives the command generated by the voice information control being clicked on, and transmits the received command to the second processing module. The second processing module triggers the process of displaying the voice information according to the command. Through the second displaying module displaying the on-screen voice information displaying control, the process of voice information displaying can be triggered with more convenience and accuracy.

Further, the method 300 also includes, after the voice information displaying command is received, the objects mapped in the relationship to the voice information are displayed with special effects. After the second processing module receives the command to display the voice information, the second displaying module displays the objects associated in a mapping relationship with the voice information in special effects, e.g., blurring, framing the outline of the object with red borders, displaying the object in a three dimensional manner, popping up cursor controls for the area corresponding to the object, highlighting etc.

It should be appreciated by one having ordinary skill in the art that, corresponding to the method of displaying voice information, embodiments of the present disclosure also provide for an apparatus for displaying voice information.

Figure 4:
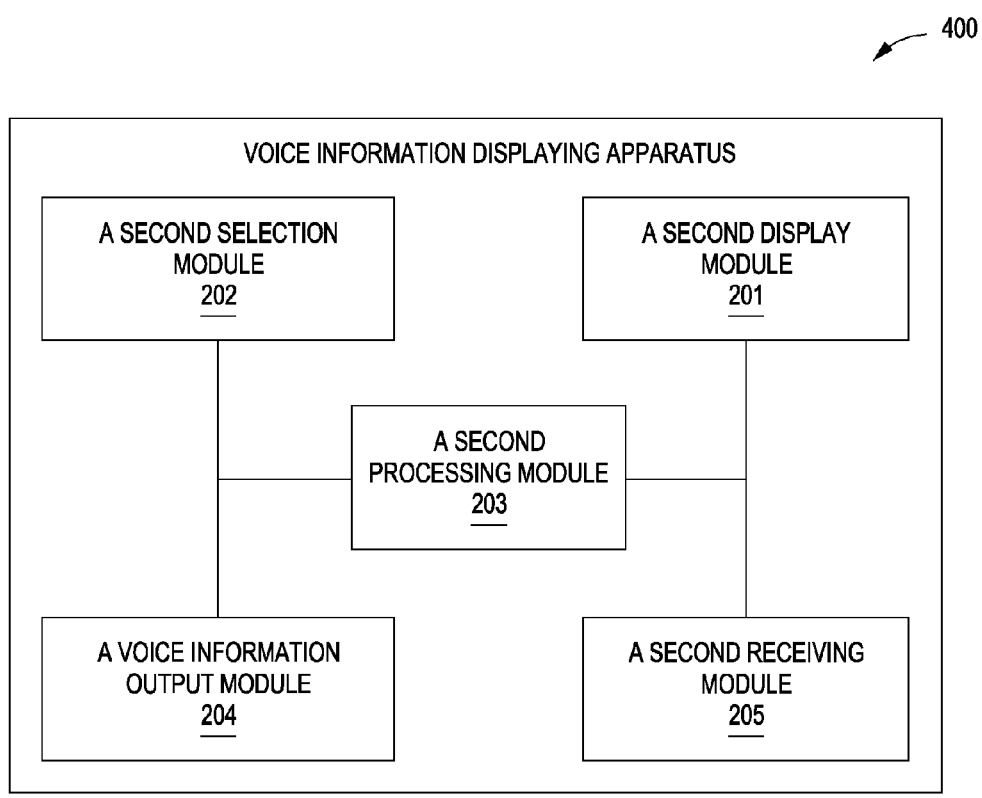
FIG. 4 is a block diagram of an exemplary apparatus for voice information displaying in accordance with an embodiment of the present disclosure.

Referring to FIG. 4, a block diagram of an exemplary apparatus for voice information display is shown in accordance with embodiments of the present disclosure. The voice information displaying apparatus 400 includes a second displaying module 201, a second selection module 202, a second processing module 203 and a voice information output module 204. The second displaying module 201 is configured to display pictures, which include objects and voice information mapped to the objects. The second selecting module 202 is configured to receive a second selection command. The processing module 202 is configured to designate the selected object as the object to be displayed, and to inquire about the voice information mapped to the object to be displayed. The voice information output module 204 is configured to display the voice information. The apparatus 400 can also include a second receiving module 205, configured to receive a voice information displaying command prior to displaying the voice information.

Further, the second processing module 203 is configured to create a voice information displaying control. The second displaying module 201 is configured to display the voice information displaying control. The second receiving module 205 is configured to receive the command generated by the voice information displaying control being clicked on. The second displaying module 201 is configured to, after the second receiving module 205 receives the command to display the voice information, display the objects mapped to the voice information with special effects.

Figure 5:
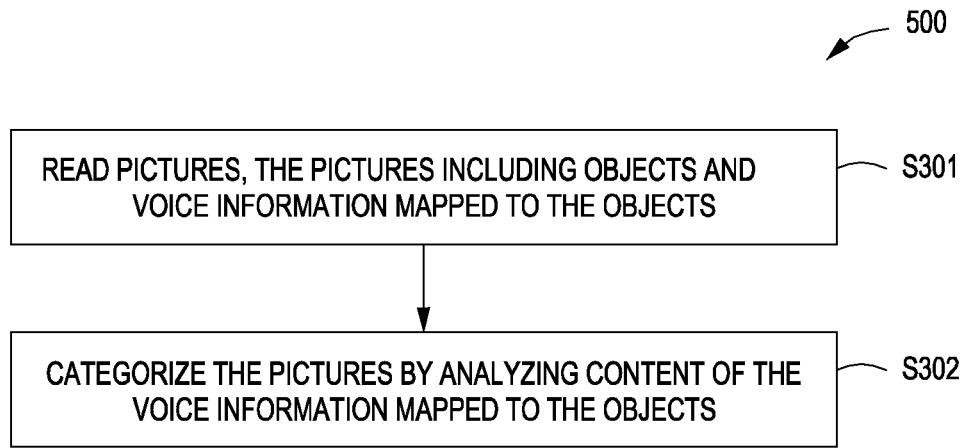
FIG. 5 is a flow chart of an exemplary method of picture categorization in accordance with an embodiment of the present disclosure.

Referring to FIG. 5, a flow chart of an exemplary method of categorizing pictures is shown in accordance with embodiments of the present disclosure. The method 500 starts in step S301, where pictures are retrieved; the pictures include the objects and the voice information mapped to the objects. In this exemplary embodiment, the executing entity is the picture categorizing apparatus, which includes a retrieving module configured to retrieve the pictures.

In step S302, the pictures are categorized by analyzing the content of the mapped voice information. The picture categorizing apparatus 500 includes a third processing module configured to transmit the pictures retrieved by the retrieving module to the third processing module. The third processing module is configured to categorize the pictures by analyzing the content of the voice information mapped to the objects.

Further, the pictures can be categorized according to information including time, address or people associated with the voice information. In particular, the third processing module can categorize the voice information mapped to the objects in the following exemplary categories: time information, address information, people information, etc. In one example, given that the content of the voice information mapped to the objects includes "Dec. 12, 2009," the third process module enters an index of "2009/1/2/12" into the category of time information index, and saves the picture corresponding to the object in a corresponding file folder. In another example, given that the content of the voice information mapped to the objects includes "Zhenjiag, Hangzhou," the third processing module enters an index of "Zhejiang, Hangzhou" into the category of address information index, and saves the picture corresponding to the objects in a corresponding file folder. In still another example, given that the content of the voice information mapped to the objects includes "grandpa," the third processing module enters an index of "grandpa" into the category of people information index, and saves the picture corresponding to the objects in a corresponding file folder. Through the analysis of the content of the voice information mapped to the objects, the pictures are categorized. With accurate definition and accurate categorization by the user, the user can easily find the pictures.

It should be appreciated by one having ordinary skill in the art that, corresponding to the method of displaying voice information, embodiments of the present disclosure also provide for an apparatus for displaying voice information.

Figure 6:
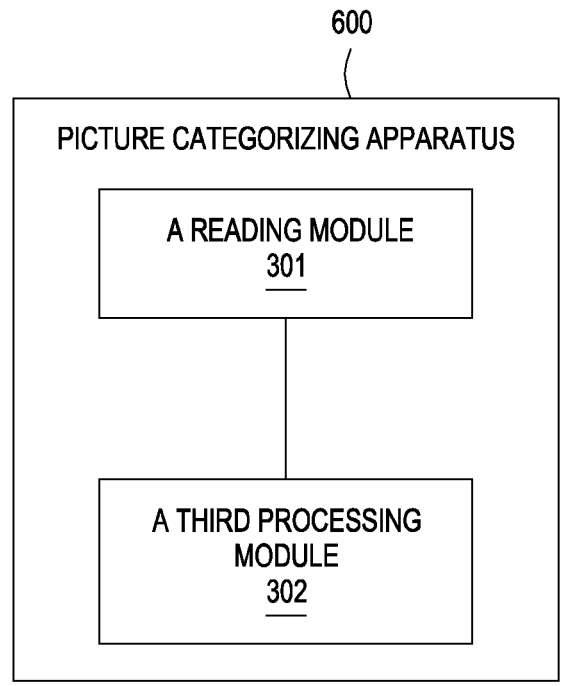
FIG. 6 is a block diagram of an exemplary apparatus for picture categorization in accordance with an embodiment of the present disclosure.

Referring to FIG. 6, a block diagram of an exemplary apparatus for categorizing pictures is shown in accordance with embodiments of the present disclosure. Apparatus 600 includes a read module 301 and a third processing module 302. The read module is configured to read pictures; the pictures include the objects and the voice information mapped to the objects. The third processing module 302 is configured to categorize pictures by analyzing the content of the voice information mapped to the objects. Further, the third processing module 302 is configured to categorize pictures according to information such as time, address, or people associated with the voice information.

Figure 7:
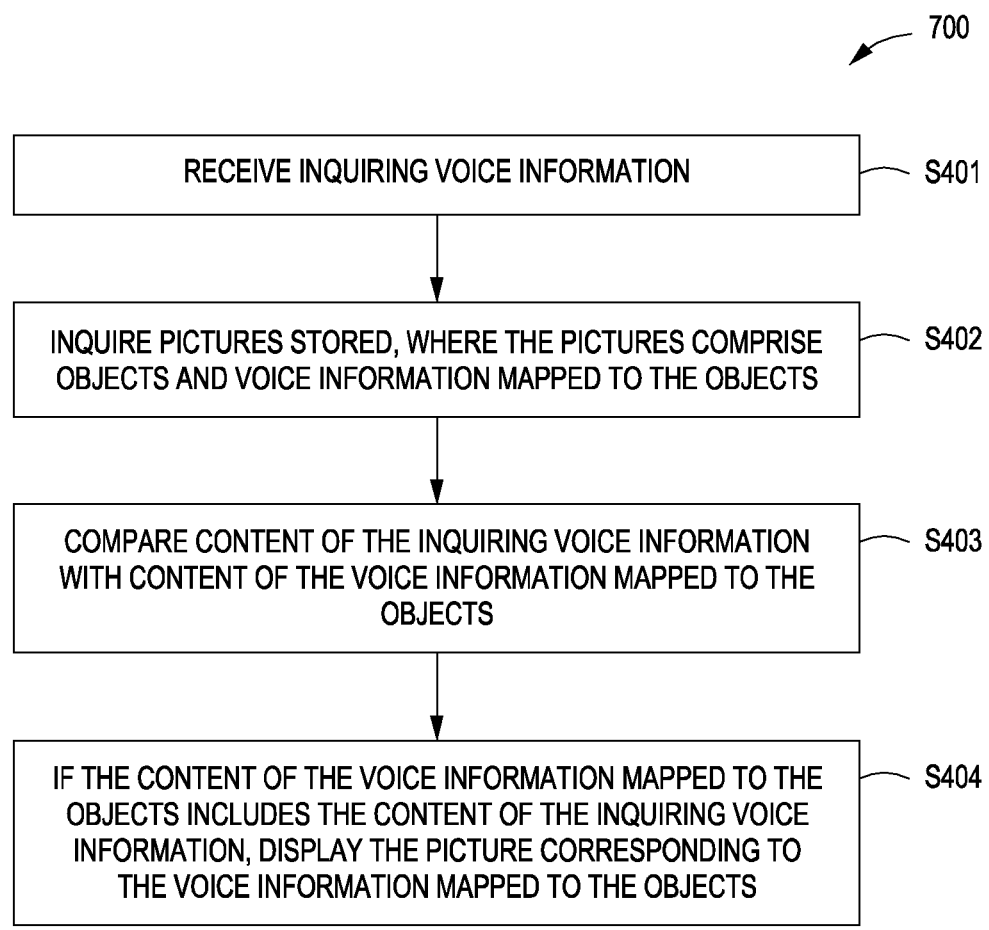
FIG. 7 is a flow chart of an exemplary method of picture retrieving in accordance with an embodiment of the present disclosure.

Referring to FIG. 7, a flow chart of an exemplary method of retrieving pictures is shown in accordance with embodiments of the present disclosure. Method 700 starts in step S401, where the voice information for retrieving is received. In this exemplary embodiment, the executing entity is the picture retrieving apparatus, which includes a second voice information input module configured to receive the voice information for retrieval.

In step S402, the stored pictures are inquired, where the pictures include the objects and the voice information mapped to the objects. The picture retrieving apparatus includes an inquiring module, to which the second voice information input module transmits the received voice information for retrieval. The inquiring module is configured to inquire about the stored pictures, which include the objects and the voice information mapped to the objects.

In step S403, the content of the inquiring voice information is compared to the content of the voice information mapped to the objects. The picture retrieving apparatus also includes a comparing module, which compares the content of the inquiring voice information to the content of the voice information mapped to the objects.

In step S404, if the content of the voice information mapped to the objects includes the content of the inquiring voice information, then the picture corresponding to the mapped voice information is displayed. The picture retrieving apparatus also includes a third displaying module, which is configured to display the pictures corresponding to the mapped voice information, if the content of the voice information mapped to the objects includes the content of the inquiring voice information.

In particular, in one example, the second voice input module receives the inquiring voice information, which is input by the user and has the content of "Dec. 12, 2009." The second voice information input module transmits the received inquiring voice information to the inquiring module, which inquires about the stored pictures. The comparing module receives from the inquiring module the retrieval voice information and the retrieved pictures from the stored pictures. The comparing module then compares content of the retrieval voice information with the content of the voice information mapped to the objects. If the content of the voice information mapped to the objects includes "Dec. 12, 2009," the third displaying module displays the picture corresponding to the objects.

Further, the content of the inquiring voice information can include one or more key words. If the content of the mapped voice information includes all the key words of the content of the inquiring voice information, the picture corresponding to the object mapped to the voice information is displayed.

In particular, in another example, the second voice input module receives an inquiring voice information, which is input by the user and has the content of "Dec. 12, 2009," "Hangzhou" and "grandpa." The second voice information input module transmits the inquiring voice information to the inquiring module, which inquires as to the stored pictures. The comparing module receives from the inquiring module the inquiring voice information and the inquired stored pictures. The comparing module then compares the content of the inquiring voice information with the content of the voice information mapped to the objects. If the content of the voice information mapped to the inquired object contains both "Dec. 12, 2009" and "Hangzhou" and "grandpa", the third displaying module displays the picture corresponding to the object.

It should be appreciated by one having ordinary skill in the art that, corresponding to the method of retrieving pictures, embodiments of the present disclosure also provide for an apparatus for retrieving pictures.

Figure 8:
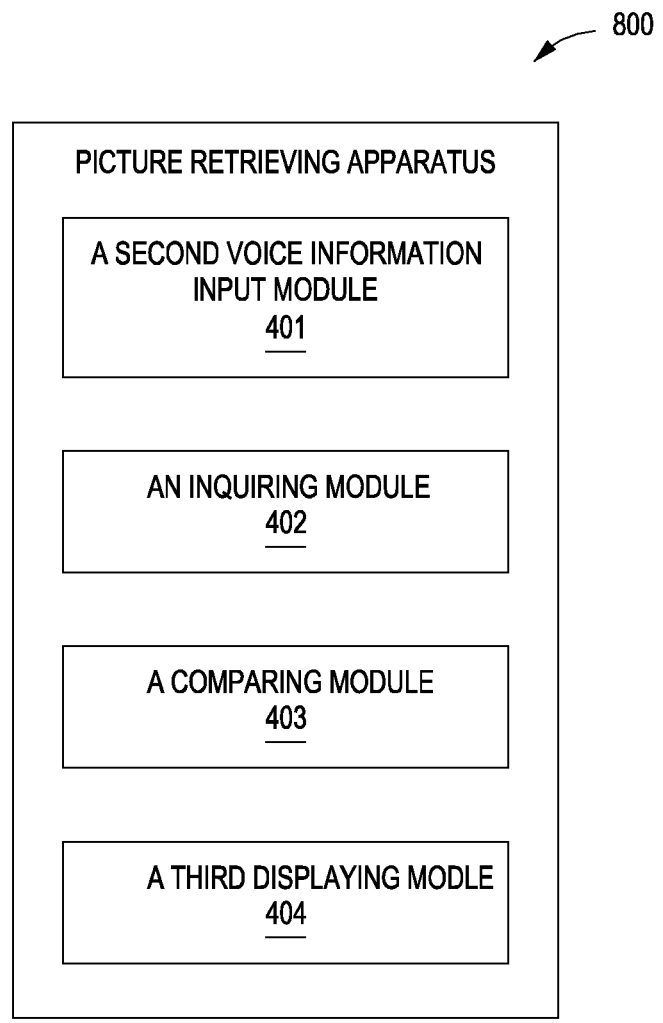
FIG. 8 is a block diagram of an exemplary apparatus for picture retrieving in accordance with an embodiment of the present disclosure.

Referring to FIG. 8, a block diagram of an exemplary apparatus for retrieving pictures is shown in accordance with embodiments of the present disclosure. Apparatus 800 includes a second voice information input module 401, an inquiring module 402, a comparing module 403 and a third display module 404. The second voice information input module 401 is configured to receive inquiring voice information. The inquiring module 402 is configured to inquire as to the stored pictures, which include the objects and the voice information mapped to the objects. The comparing module 403 is configured to compare the content of the inquiring voice information with the content of the voice information mapped to the objects. The third display module 404 is configured to display the pictures corresponding to the voice information mapped to the objects, if the content of the voice information mapped to the objects includes the content of the inquiring voice information.

Further, the content of the inquiring voice information includes one or more key words. The third display module 404 is configured to, if the content of the voice information mapped to the objects includes all the key words of the inquiring voice information, display the pictures corresponding to the voice information.

Figure 9A:
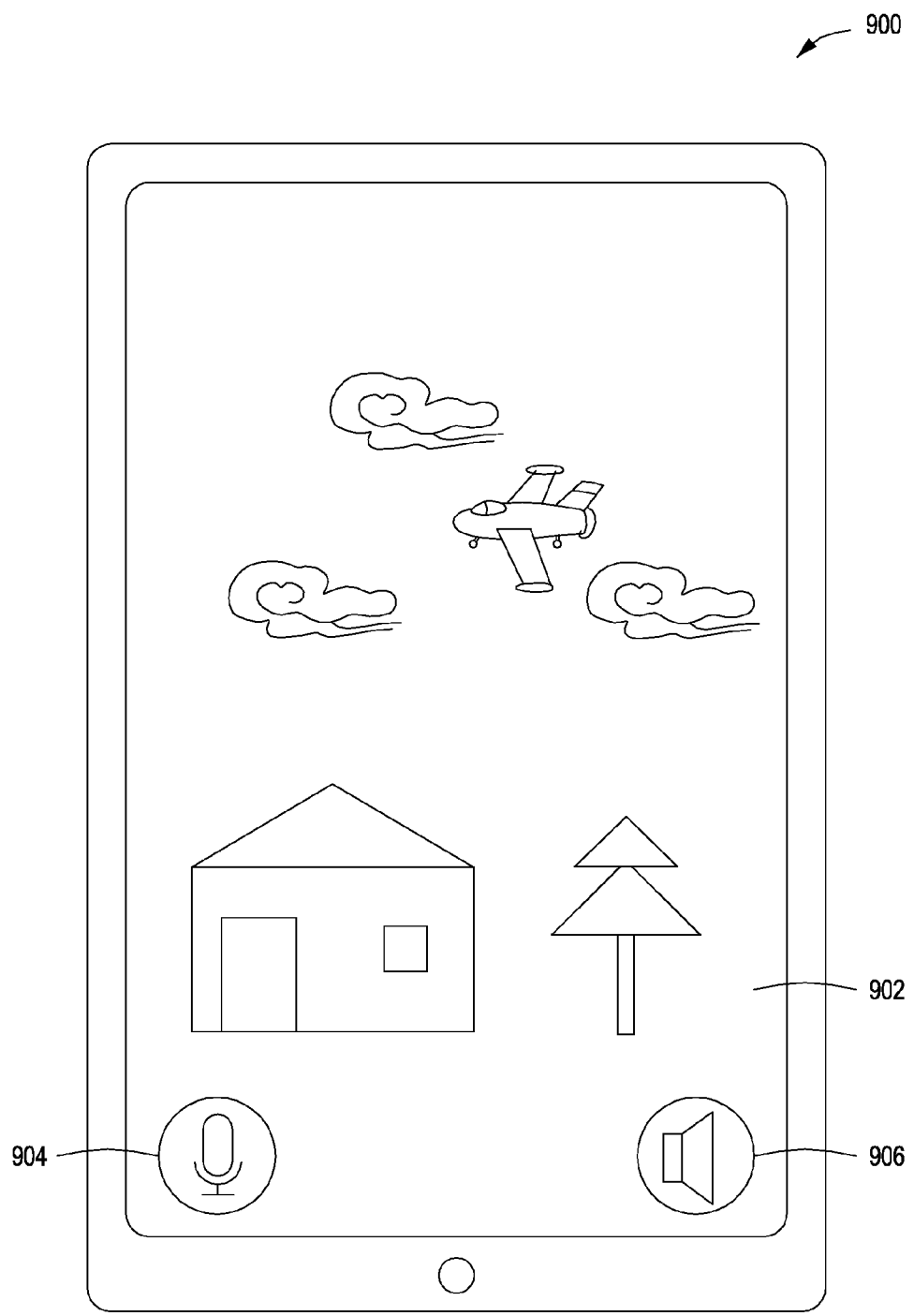
FIGS. 9A-9E are diagrams that illustrate an exemplary flow of picture retrieving operations in accordance with an embodiment of the present disclosure.

Referring to FIGS. 9A-9E, an illustration of an exemplary flow of practical picture retrieving operations is shown in accordance with an embodiment of the present disclosure. In FIG. 9A, an exemplary mobile terminal functions as the executing entity. The mobile terminal 900 includes a processor, memory, touch screen display 902, microphone 904 and speaker 906, etc. The memory stores several pictures. When the processor reads a picture from the memory, it triggers touch screen display 902 to display the picture. When the touch screen display 902 displays the picture, at the same time the processor renders a button of microphone 904 and a button of a speaker 906, which are also displayed by the touch screen 902.

Figure 9B:
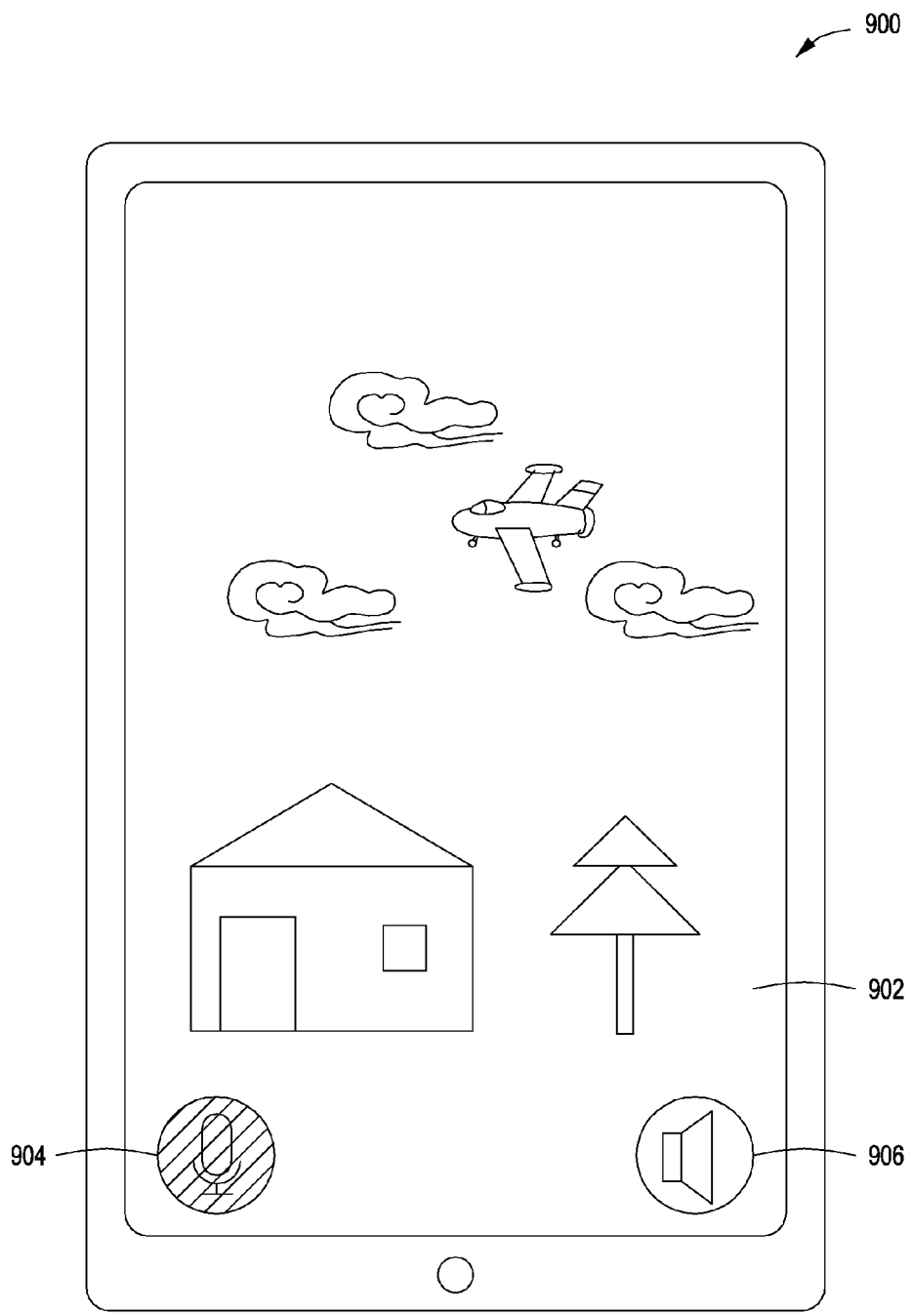
Figure 9C:
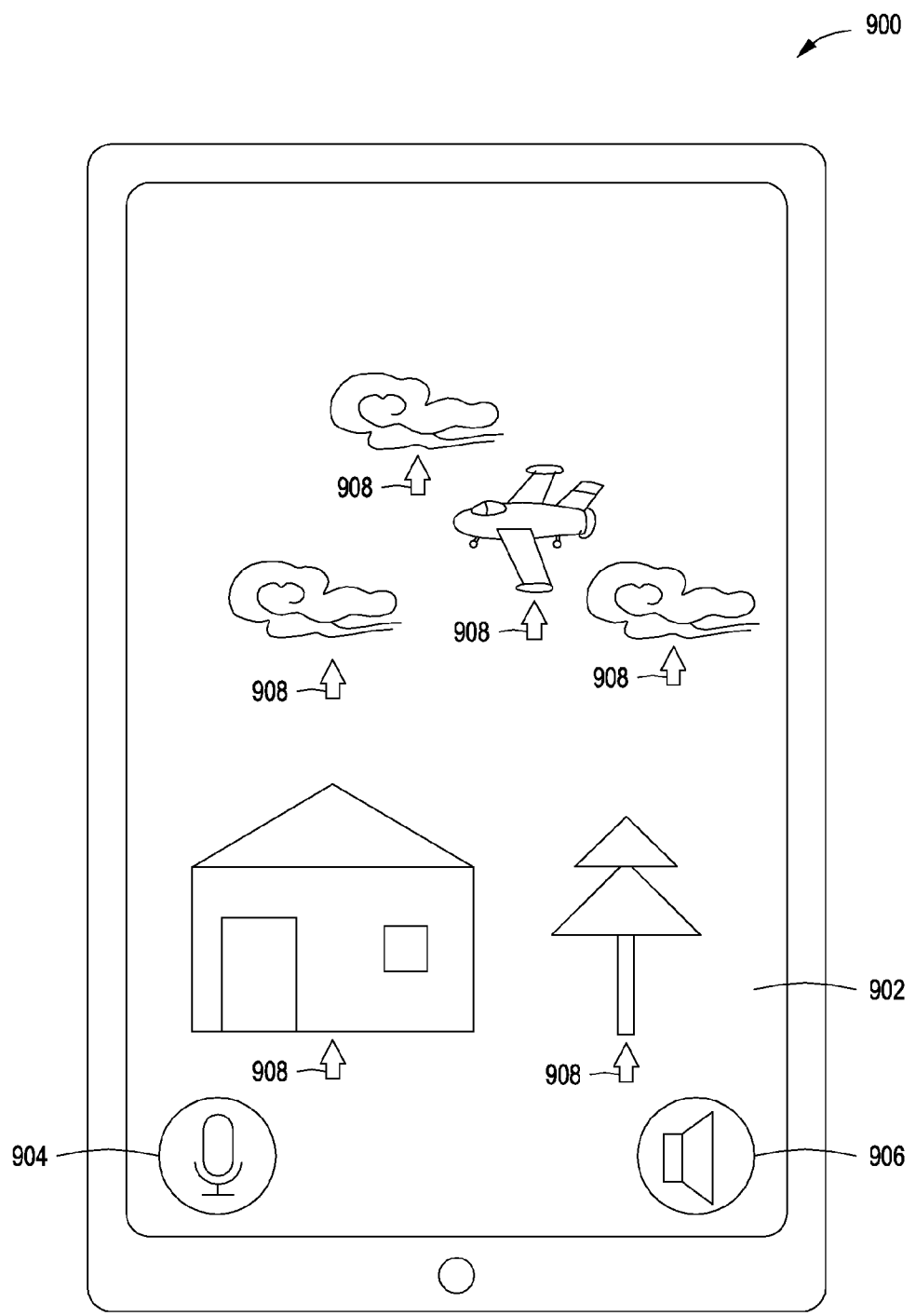

Referring to FIGS. 9B-9C, when the user needs to add voice information to the picture's objects, the user clicks on the microphone button 904. When the touch screen 902 receives the corresponding command by its touch receiving module, it transmits the command to the processor. The processor receives the command and enters a process of voice information augmentation. At the same time, all the objects in the picture are recognized by the processor, and cursors 908 are popped up at the positions corresponding to the objects on the touch screen. Based on a selection, the user presses down the cursor such that the touch screen 902 receives the user command and transmits the command to the processor. The processor receives the command and enters a process of voice recording. When the user inputs voice information via the microphone, it is transmitted to the processor. When the voice information recording ends, the user releases the pressed cursor. The processor establishes a mapping relationship between the voice information and the object corresponding to the pressed cursor.

In order to ensure security, the processor also configures part of the voice information as only being accessible and editable by the user, and not by anyone else, based on the user setting. Part of the voice information can also be configured as public for all users to access. The user who performs voice information augmentation has the highest access permission, e.g., which allows access permission configuration for all the voice information mapped to all the objects in the picture. After the picture is shared, other users can only access according to their configured access permissions. The processor determines the users based upon the identification code of the devices.

The processor creates (for the picture) the following labels: the objects augmented with the voice information, the compression format of voice information, the beginning and the end of the voice information, the access permission for the voice information, and the identification code of the device conducting the voice information augmentation. In order to save storage space, the voice information can be compressed in the MP3 format, for example.

Figure 9D:
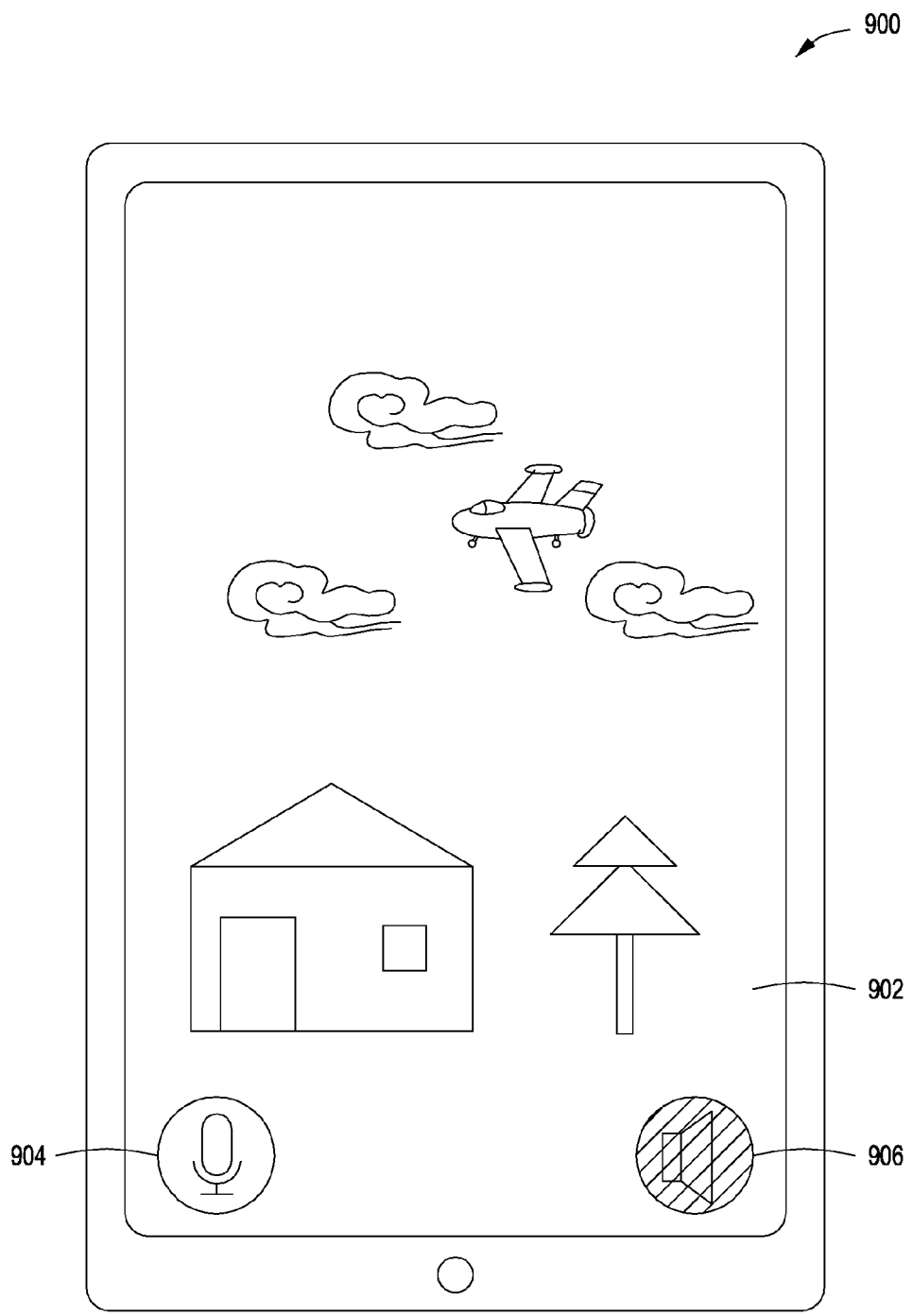
Figure 9E:
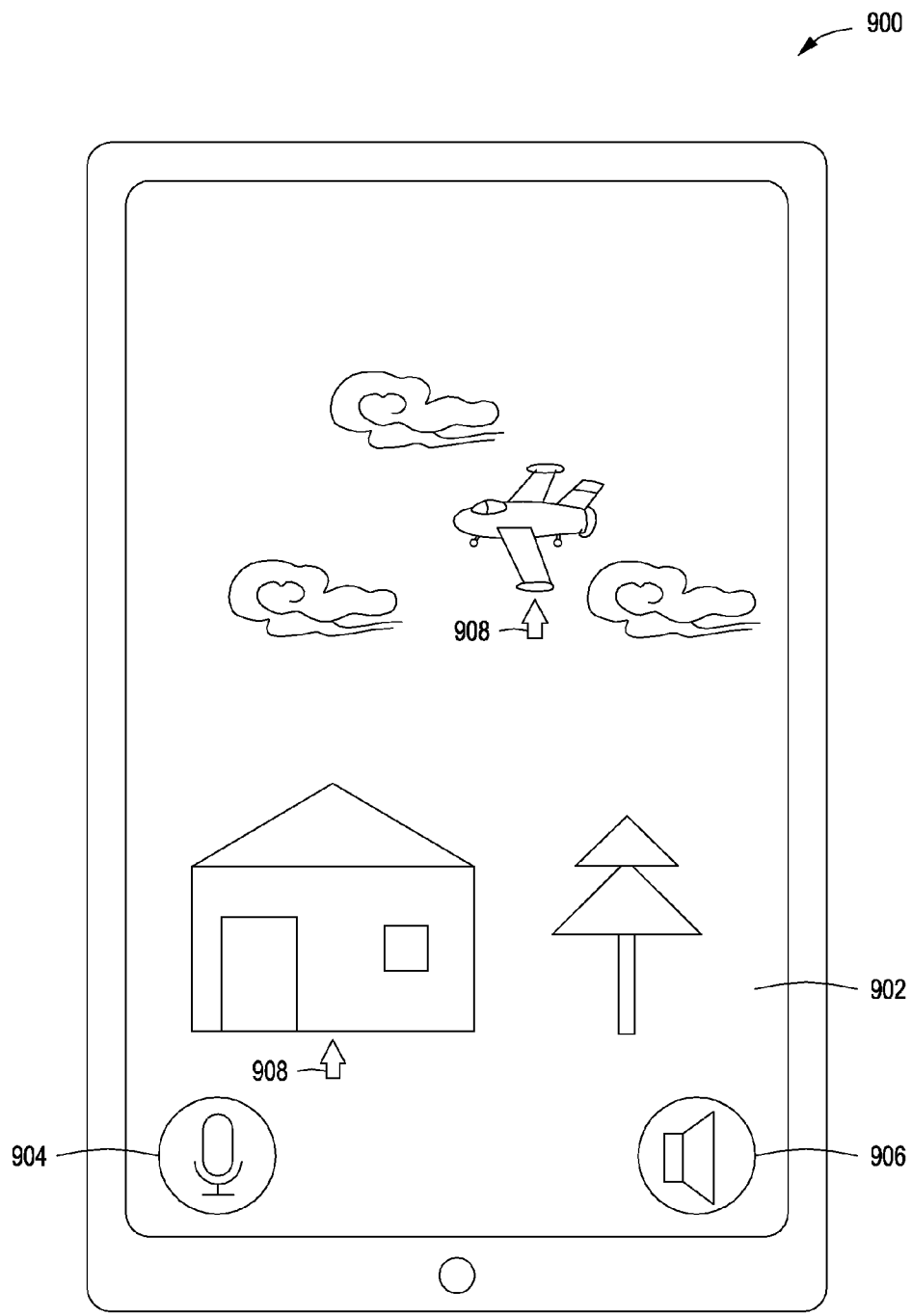

Referring to FIGS. 9D-9E, when the user wants to display the voice information mapped to the objects in the picture, the user clicks on the speaker button 906. The touch screen 902 receives the user command and transmits it to the processor. The process receives the command and enters a process of displaying the voice information. At the same time, all the objects in the picture that have mapped voice information are recognized by the processor, and cursors are also popped up at the positions corresponding to the objects mapped to the voice information in the picture. In this exemplary embodiment, given that the picture includes a house object and an airplane objected being augmented with the voice information, the user clicks on the cursors 908 such that the touch screen 902 receives the user command and transmits the command to the processor. The processor searches for the objects according to the user command, and the voice information mapped to the objects. Further, the processor triggers the speaker to render the voice information.

Furthermore, the processor can also render an on-screen retrieving button. When the user needs to retrieve a picture, the user clicks on the retrieving button. The touch screen 902 receives the user command by the touch control module and transmits the command to the processor. The processor receives the command and enters a process of picture retrieving. The user inputs the inquiring voice information through the microphone, and the microphone transmits the voice information to the processor. The processor inquires as to the pictures stored in the memory, and compares the content of the inquiring voice information with the content of the voice information mapped to the objects in the pictures. If the comparing results indicate the content is the same, the processor triggers the touch screen display to display the picture mapped to the voice information.

Embodiments of the present disclosure can be implemented using software, hardware, firmware, and/or the combinations thereof. Regardless of being implemented using software, hardware, firmware or the combinations thereof, instruction code can be stored in any kind of computer readable media (for example, permanent or modifiable, volatile or non-volatile, solid or non-solid, fixed or changeable medium, etc.). Similarly, such medium can be implemented using, for example, programmable array logic (PAL), random access memory (RAM), programmable read only memory (PROM), read only memory (ROM), electrically erasable programmable ROM (EEPROM), magnetic storage, optical storage, digital versatile disc (DVD), or the like.

It is appreciated that, modules or blocks described by embodiments of the present disclosures are logical modules or logical blocks. Physically, a logical module or logical block can be a physical module or a physical block, a part of a physical module or a physical block, or the combinations of more than one physical modules or physical blocks. Physical implementation of those logical module or logical blocks is not necessary functionalities realized by the modules, blocks and the combinations thereof are key to solving the problems addressed by the present disclosure. Further, in order to disclose the novelties of the present disclosure, the above described embodiments do not disclose about those modules or blocks not too related to solving the problems addressed by the present disclosure, which does not mean that the above described embodiments cannot include other modules or blocks.

It is also necessary to point out that, in the claims and specification of the present disclosure, terms such as first and second only are for distinguishing an embodiment or an operation from another embodiment or operation. It does not require or imply that those embodiments or operations having any such real relationship or order. Further, as used herein, the terms "comprising," "including," or any other variation intended to cover a non-exclusive inclusion, such that a process, method, article, or apparatus that comprises a list of elements does not include only those elements but may include other elements not expressly listed or inherent to such process, method, article, or apparatus. Absent further limitation, elements recited by the phrase "comprising a" does not exclude a process, method, article, or apparatus that comprises such elements from including other same elements.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable medium used to actually carry out the distribution. The embodiments disclosed herein may also be implemented using software modules that perform certain tasks. These software modules may include script, batch, or other executable files that may be stored on a computer-readable storage media or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present disclosure and its advantages have been described in detail, it should be understood that various changes substitutions, and alterations can be made herein without departing from the spirit and scope of the disclosure as defined by the appended claims. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

What is claimed is:

1. A computer-implemented method of voice information augmentation, the method comprising:
   displaying a picture;
   identifying a plurality of objects in the picture;
   displaying a plurality of voice augmentation buttons at positions that lie laterally adjacent to the objects, the shapes of the buttons being substantially different than the shapes of the objects;
   detecting a user input at a first voice augmentation button of the plurality of voice augmentation buttons, wherein the first voice augmentation button is associated with a first object of the plurality of objects;
   receiving voice information; and
   establishing and storing a mapping relationship between the voice information and the first object.

2. The method of claim 1, further comprising extracting one or more keywords from the voice information.

3. The method of claim 2, further comprising:
   receiving a picture retrieval request that includes one or more requested keywords; and
   identifying a stored picture having one or more keywords that match the one or more requested keywords.

4. The method of claim 1, wherein identifying the plurality of objects in the picture further comprises:
   recognizing an object in the picture by use of image structure segmentation and image non-structure segmentation; and
   utilizing a special effect to display the object.

5. The method of claim 1, wherein identifying the plurality of objects in the picture further comprises:
   receiving a hand motioned delineation command, wherein the delineation command is utilized to identify a region;
   based on the region and by use of image structure segmentation or image non-structure segmentation, determining an object positioned within the region; and identifying the object positioned with the region as an object to be augmented.

6. The method of claim 1, further comprising:
selecting the first object after the mapping relationship has been stored; and
displaying the voice information mapped to the first object.

7. A computer-implemented method of voice information augmentation, the method comprising:
displaying a picture;
identifying a plurality of objects in the picture;
displaying a plurality of voice augmentation buttons at positions corresponding to the objects;
detecting a user input at a first voice augmentation button of the plurality of voice augmentation buttons, wherein the first voice augmentation button is associated with a first object of the plurality of objects;
receiving voice information;
establishing and storing a mapping relationship between the voice information and the first object;
receiving an access permission configuring command; and
based on the command, configuring an access permission for the voice information corresponding to the first object, the access permission being selected from the group of public or private, and further comprising:
if a device performs the voice information augmentation, permitting the device to access and edit the voice information;
if the device does not perform the voice information augmentation and the access permission for the voice information is public, permitting the device to access the voice information but not to edit the voice information; and
if the device does not perform the voice information augmentation and the access permission for the voice information is private, not allowing the device to access or edit the voice information.

8. An apparatus for voice augmentation, the apparatus comprising:
a processor;
a first display unit to display a picture; and
a non-transitory computer-readable medium coupled to the processor, the non-transitory computer-readable medium having computer-readable instructions stored thereon to be executed by the processor, the instructions comprising:
identifying a plurality of objects in the picture;
receiving voice information;
displaying a plurality of voice augmentation buttons at positions that lie laterally adjacent to the plurality of objects, the shapes of the buttons being substantially different than the shapes of the objects;
detecting a user input at a first voice augmentation button of the plurality of voice augmentation buttons, wherein the first voice augmentation button is associated with a first object of the plurality of objects; and
establishing and storing a mapping relationship between the voice information and the first object.

9. The apparatus of claim 8, wherein the instructions further comprise:
recognizing objects in the picture by use of image structure segmentation or image non-structure segmentation; and
displaying the objects with special effects.

10. The apparatus of claim 8, wherein the instructions further comprise:

receiving a hand motioned delineation command,
determining a region based on the delineation command,
based on the region and by use of image structure segmentation and image non-structure segmentation, determining an object positioned within the region; and
identifying the object positioned with the region as an object to be augmented.

11. The apparatus of claim 8, wherein the instructions further comprise:
receiving a picture retrieval request that includes one or more requested keywords; and
identifying a stored picture having one or more keywords in the voice information that match the one or more requested keywords such that a matching picture has all of the requested keywords.

12. An apparatus for voice augmentation, the apparatus comprising:
a processor;
a first display unit configured to display a picture; and
a non-transitory computer-readable medium coupled to the processor, the non-transitory computer-readable medium having computer-readable instructions stored thereon to be executed by the processor, the instructions comprising:
a first processing module configured to identify a plurality of objects in the picture;
a first voice information input module configured to receive voice information;
a first receiving module configured to receive a command for voice information augmentation, wherein the first display unit is configured to display a plurality of voice augmentation buttons at positions corresponding to the plurality of objects, wherein the first receiving module is configured to receive the command for voice information augmentation responsive to a first voice augmentation button of the plurality of voice augmentation buttons being user selected, wherein the first voice augmentation button is associated with a first object of the plurality of objects, and wherein the first processing module is further configured to establish and store a mapping relationship between the voice information and the first object;
an access permission configuration module configured to receive an access permission configuring command and to configure access permissions for the voice information mapped to the objects to be augmented based on the access permission configuring command, the access permission being selected from the group of public or private, and wherein, if the apparatus performs the voice information augmentation, the apparatus is permitted to access and edit the voice information, if another apparatus performs the voice information augmentation and the access permission for the voice information is public, the apparatus is permitted to access the voice information but not to edit the voice information, if another apparatus performs the voice information augmentation and the access permission for the voice information is private, the apparatus is not permitted to access or edit the voice information.

13. A non-transitory computer-readable storage medium having embedded therein program instructions, when executed by one or more processors of a device, causes the device to execute a process for voice information augmentation, the process comprising:
displaying a picture;
identifying a plurality of objects in the picture;

displaying a plurality of voice augmentation buttons at positions that lie laterally adjacent to the objects, the shapes of the buttons being substantially different than the shapes of the objects;

detecting a user input at a first voice augmentation button of the plurality of voice augmentation buttons, wherein the first voice augmentation button is associated with a first object of the plurality of objects;

receiving voice information; and establishing a mapping relationship between the voice information and the first object.

14. The non-transitory computer-readable storage medium of claim 13, wherein the process further comprises extracting one or more keywords from the voice information.

15. The non-transitory computer-readable storage medium of claim 14, wherein the process further comprises:

receiving a picture retrieval request that includes one or more requested keywords; and identifying a stored picture having one or more keywords that match the one or more requested keywords.

16. The non-transitory computer-readable storage medium of claim 13, wherein identifying the plurality of objects in the picture comprises:

recognizing an object in the picture by use of image structure segmentation and image non-structure segmentation; and utilizing a special effect to display the object.

17. The non-transitory computer-readable storage medium of claim 13, wherein the process further comprises:

selecting the first object after the mapping relationship has been stored; and displaying the voice information mapped to the first object.

18. A non-transitory computer-readable storage medium having embedded therein program instructions, when executed by one or more processors of a device, causes the device to execute a process for voice information augmentation, the process comprising:

displaying a picture;

identifying a plurality of objects in the picture;

displaying a plurality of voice augmentation buttons at positions corresponding to the objects;

detecting a user input at a first voice augmentation button of the plurality of voice augmentation buttons, wherein the first voice augmentation button is associated with a first object of the plurality of objects;

receiving voice information;

establishing a mapping relationship between the voice information and the first object;

receiving an access permission configuring command; and based on the command, configuring an access permission for the voice information corresponding to the first object, the access permission being selected from the group of public or private, and further comprising:

if the device performs the voice information augmentation, permitting the device to access and edit the voice information; if the device does not perform the voice information augmentation and the access permission for the voice information is public, permitting the device to access the voice information but not to edit the voice information; and if the device does not perform the voice information augmentation and the access permission for the voice information is private, not allowing the device to access or edit the voice information.

* * * * *